INVENTOR.
WILLIAM H. NEWELL

BY Victor D. Borst
ATTORNEY

March 17, 1964

W. H. NEWELL 3,125,677

ADDING NETWORKS

Original Filed July 20, 1953

3 Sheets-Sheet 3

BEFORE SCALING

AFTER SCALING

INVENTOR.
WILLIAM H. NEWELL

BY Victor D Borst
ATTORNEY

United States Patent Office 3,125,677
Patented Mar. 17, 1964

3,125,677
ADDING NETWORKS

William H. Newell, Mount Vernon, N.Y. (% Ford Instrument Co., 31—10 Thomson Ave., Long Island City 1, N.Y.)

Original application July 20, 1953, Ser. No. 369,073. Divided and this application Mar. 1, 1960, Ser. No. 12,235
2 Claims. (Cl. 235—193)

The present invention relates to a computing device and more particularly to a network for algebraically adding variable quantities. The application is a division of application Serial No. 369,073 filed July 20, 1953 now abandoned.

One of the principal basic devices of an electrical computer is the adding network. In such a network, it is required that two or more variable input quantities in the form of voltages be algebraically added continuously, so that by the proper selection of the sign of the input voltages, these quantities may be arithmetically added, subtracted or otherwise compared as desired.

One object of the present invention is to provide a new and improved adding network, which is designed to add algebraically and accurately, input quantities in the form of voltages, and which meets all the requirements for economical manufacture, and accurate, efficient operation.

The adding network of the present invention comprises a plurality of input circuits, which may be connected to different computation channels respectively, and which are joined at their output ends in a common connection to serve as electrical adding differentials. These input circuits are electrically equivalent to a corresponding number of simple input resistors respectively connected at their output ends to a common point, and are adapted to have applied thereto the input voltages corresponding to the variable quantities to be added algebraically. For the purpose of the present invention, an input circuit is considered the equivalent of a simple input resistor it may replace, if said circuit receives the same applied voltage as said simple input resistor would and if the current drawn from the common output connection of a number of input circuits including said replacing circuit is the same as is drawn from the common output connection of a corresponding number of simple input resistors including the replaced resistor. The common output connection of the input circuits is maintained at zero potential and the input circuits are relieved of the load of the adding networks by amplifying means, which may take the form of a simple computing amplifier or of a servomechanism. Connected between the output side of this amplifying means and the common output connection of the input circuits is a feedback resistor. The resistances of the input circuits and of the feedback resistors are selected to convert the input voltages and the voltage at the output side of the amplifying means to a common scale, so that these voltages will have the same value per volt and the voltage at the output side of said amplifying means will be proportional to the algebraic sum of the input voltages.

The use of simple resistors for the input circuits of the adding network may be satisfactory under certain conditions. However, the maximum permissible value of resistance which may be used is limited, because of (*a*) insulation resistance, (*b*) impedance of output circuit, (*c*) stray capacitance between leads, (*d*) manufacturing difficulties and (*e*) space requirements. It has, consequently, been found desirable to limit the maximum value of any one fixed resistance in an adding network.

Where the calculated resistance value for a simple input resistor exceeds the required limit, a voltage divider network may replace this resistor to reduce the resistance value of the components of the circuit which replace this resistor. Where only one resistor exceeds the desired resistance value, a single voltage divider may be employed to replace this one resistor.

As a feature of the present invention, where more than one resistor exceeds the desired resistance value, instead of providing a number of voltage dividers, a single multiple divider is provided designed to limit the resistance values of the input circuits.

Various other objects, features and advantages of the present invention are apparent from the following particular description and from the accompanying drawings, in which FIG. 1 shows the diagram of a series of resistors having a common output connection and employed herein to illustrate certain principles of the present invention and to derive certain formulas used in the development of the adding network of the present invention;

Figure 8:
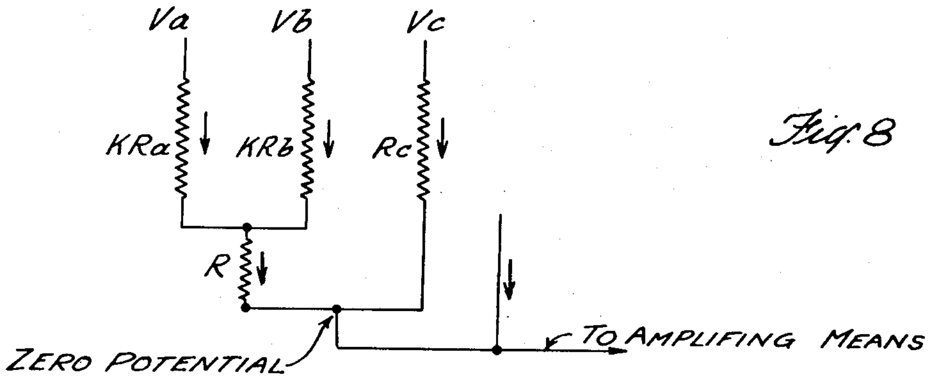
FIG. 8 shows another form of adding network, which embodies the present invention and which is similar to that shown in FIG. 7, except that only two of the original or calculated input resistors of FIG. 6 are replaced by a multiple voltage divider.
Figure 9:
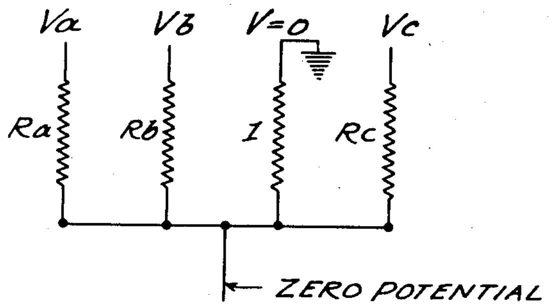
Figure 10:
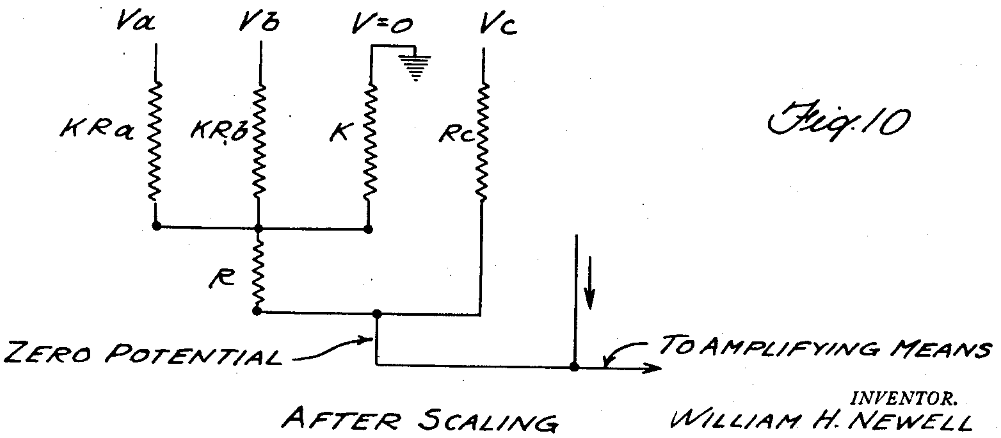

FIG. 9 shows a theoretically calculated original network of three input resistors scaled to a common basis to permit the addition of the input voltages applied thereto and having an added grounded unity resistor, this network being employed in the development of the multiply voltage divided circuit of FIG. 10; and FIG. 10 shows another form of adding network embodying the present invention and developed from the original circuit of FIG. 9, this network being similar to that shown in FIG. 8, except that a grounded resistor has been added to reduce still further certain resistances in the multiple voltage divider circuit.

The input quantities to be added for computing purposes must first be expressed as input voltages. For that purpose, each input voltage is expressed as a fraction as follows, in which the numerator is the quantity involved and the denominator the value of the quantity per volt:

$$\text{Voltage}=\frac{\text{Quantity}}{\text{Value per volt}}$$

The value of each quantity per volt is determined by dividing the maximum value possible of each quantity by the maximum value of the voltage available.

If the quantities are indicated by capital letters A, B, C . . . etc. and the values per volt by the scale letter S with the subscripts *a*, *b*, *c* . . . etc. corresponding to said quantities respectively, the fraction indicated above can be written as $$Va=\frac{A}{S_a}$$

in the case of one quantity, as $$Vb=\frac{B}{Sb}$$

in the case of a second quantity etc. and as $$V(a+b)=\frac{A+B}{S(a+b)}$$

in the case of the sum of these quantities.

It is not possible to add the input voltage V*a* and V*b* directly, for these voltages are to different scales. If, however, the different input voltages are converted to a common scale, they can be added and the resulting voltage will be proportional to $A+B$. To convert these voltages to the same scale, it is assumed that each voltage is divided by a constant R with a subscript, so that $$\frac{Va}{Ra}=\frac{A}{SaRa};\quad \frac{Vb}{Rb}=\frac{B}{SbRb};\quad \frac{V(a+b)}{R(a+b)}=\frac{A+B}{S(a+b)R(a+b)}$$

If the R values be adjusted, so that $$SaRa=SbRb=S(a+b)R(a+b)$$

then $$\frac{Va}{Ra}+\frac{Vb}{Rb}=\frac{V(a+b)}{R(a+b)}$$

or $$\frac{Va}{Ra}+\frac{Vb}{Rb}-\frac{V(a+b)}{R(a+b)}=0$$

Figure 1:
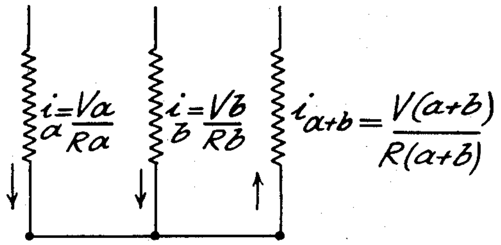
Figure 2:
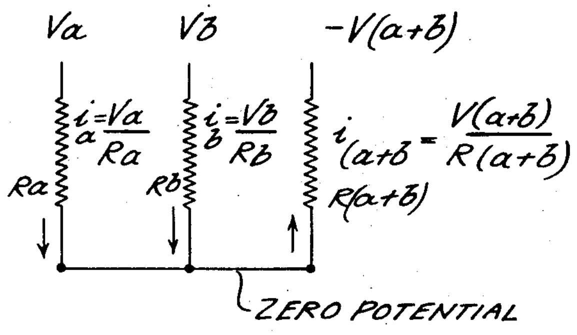
FIG. 2 shows the diagram of FIG. 1 with symbolic values of certain circuit parameters applied thereto in the further development of the adding network of the present invention.

This equation suggests according to Kirchoff's law, a plurality of currents in separate circuits directed towards a junction or common point, as shown in FIG. 1. If the common connection could be maintained at zero potential, and the resistors were assigned the values R*a*, R*b* and $R(a+b)$, the voltage at the input ends of the resistors, designated by esese values, would be V*a*, V*b* and $-V(a+b)$ respectively, as shown in FIG. 2.

The maintenance of zero potential at the common connection is accomplished by joining this connection to an amplifying means having a large gain and drawing no current from this connection. The output of the amplifying means adjusts the summing voltage, so that it tries to restore the common connection to zero potential. Due to the tremendous gain of the amplifying means, only a negligible voltage at its input is required to vary the summing voltage over the entire range.

Figure 3:
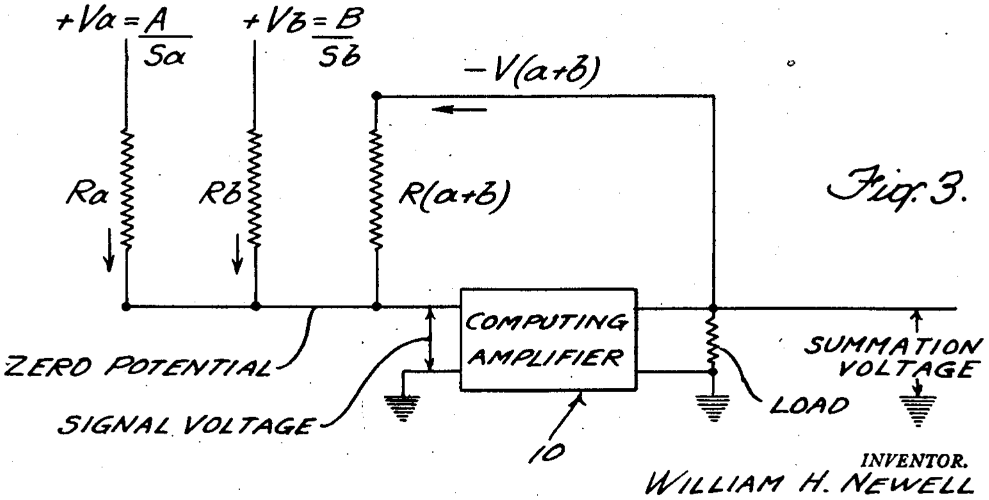
FIG. 3 shows an adding network, which comprises two simple resistors with a common output connection and a computing amplifier on the output side of said connection and which is employed herein to explain the development of the present invention.

The amplifying means connected to the output junctions of the input resistors R*a*, R*b* . . . etc. may take the form of a computing amplifier or a servomechanism. In FIG. 3, the amplifying means is indicated as a computing amplifier 10, performing the necessary load-relieving and phase reversing (180° phase displacement) functions for computation and is used to amplify the power and a signal voltage, the source of which is the input resistor network R*a*, R*b*, . . . R*n*. In a specific computer, for example, the signal voltage may be delivered at 400 cycles and the computing amplifier 10 may be either one of two standard types, known as the single channel type and the dual channel type. The standard single channel type is a single amplifier having an overall gain of approximately 20,000 and a maximum undistorted output of ±12 volts for a 500 ohm load. This 12 volt is the maximum voltage available from the single channel type of amplifier and is the figure employed with such an amplifier, to determine the value of each quantity per volt, indicated above by the symbols S*a*, S*b*, S*c*, . . . etc.

The dual channel amplifier of the standard type consists of two identical amplifiers on a single chassis, with each channel affording an overall gain of 2000 and a maximum undistorted output of ±8 volts for a 500 ohm load. This 8 volt is the maximum voltage available from the dual channel type of amplifier and is the figure employed with such an amplifier, to determine the value of each quantity per volt, indicated above by the symbols S*a*, S*b*, S*c*, . . . etc.

In the adding network shown in FIG. 3, the input resistors and the output or feedback resistor would have their resistance values R*a*, R*b* and $R(a+b)$, respectively adjusted, so that the following equation noted above, holds true.

$$SaRa=SbRb=S(a+b)R(a+b)$$

And assuming that $R(a+b)$ is selected as 1 megohm, then $$Ra=\frac{S(a+b)}{Sa}R(a+b)=\frac{S(a+b)}{Sa}\text{ megohms}$$

$$Rb=\frac{S(a+b)}{Sb}R(a+b)=\frac{S(a+b)}{Sb}\text{ megohms}$$

The above method of determining the values R can be applied to any number of inputs.

The input resistors R*a* and R*b* will have applied thereto the input voltages V*a* and V*b* equal to $$\frac{A}{Sa}\text{ and }\frac{B}{Sb}$$

respectively, while the summing voltage applied to the output or feedback resistor $R(a+b)$ will be $-V(a+b)$. The minus sign before the summing voltage denotes the phase reversal that occurs in the computing amplifier 10.

In the operation of the amplifier 10, it is desirable to use a certain value of resistance, usually about 1 megohm, from the output to the input of said amplifier. By establishing a resistance value of 1 megohm for the feedback resistor $R(a+b)$, the values of R*a* and R*b* can be determined in the manner described above.

Although it is desirable for practical and efficient operations and to maintain proper circuit conditions, to limit the maximum resistance of any one resistor in an adding network, it is also desirable to limit the minimum resistance value of any one resistor in such an adding network, to avoid adverse circuit factors, such as (*a*) resistance in connecting leads, (*b*) load in input circuits, (*c*) heat dissipation of resistors. Therefore, the resistance values in the circuit are preferably adjusted, so that the smallest R is not less than a predetermined value, usually 0.5 megohms. If values below with 0.5 megohm limit are used for any reason, the errors resulting, for example, from source impedances, should be calculated and checked to be satisfactory.

It was assumed in the build-up of the network described above, that the signal voltage to amplifier 10 was zero. This is a close approximation involving negligible error.

Figures 4, 5, 6:
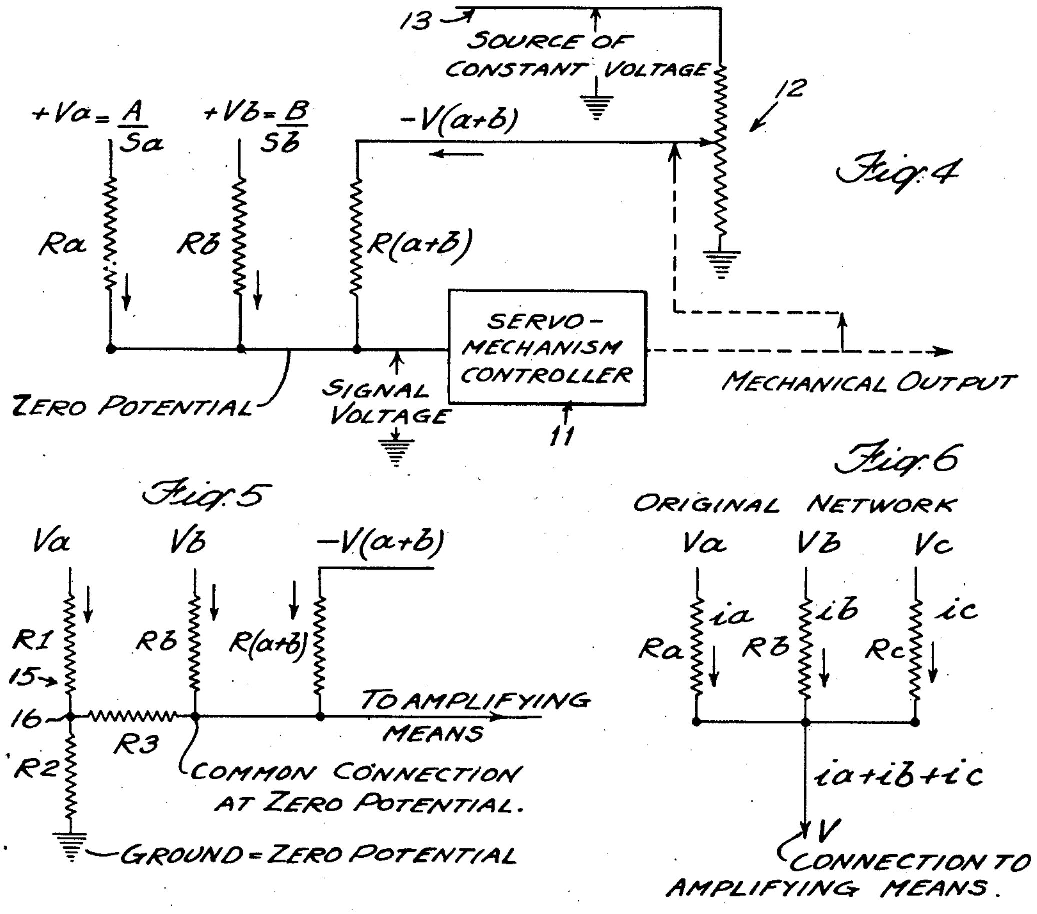
FIG. 4 shows another adding network similar to the network of FIG. 3; except that the computing amplifier is replaced by a servomechanism.
FIG. 5 shows an adding network, which has a simple input resistor of calculated excessive, resistance value replaced by a single voltage divider, and which is employed herein to explain the development of the present invention.
FIG. 6 shows a theoretically calculated original network of three input resistors scaled to a common basis to permit the addition of the input voltages applied thereto, and employed herein in the development of the adding network of FIG. 7 with a multiple voltage divider.

In FIG. 4 is shown an adding network, in which the amplifying means takes the form of a servomechanism 11. A servomechanism (also called a follow-up) is a well-known device consisting of an automatic drive operable to position a mechanical load in accurate correspondence with a signal derived from one or more inputs, without placing an appreciable load upon this input or inputs. This servomechanism has a mechanical output, which for the purpose of the present invention, is converted into an electrical output through a potentiometer 12 for feedback into the junction point of the input circuits of the adding network. The function of the servomechanism is similar to that of the computing amplifier, inasmuch as both remove loads from the adding components.

The signal source (input circuits R$a$, R$b$ . . . etc.) compares the input to the servomechanism 11 with the output. Any difference between the input and the output of the servomechanism 11 is transformed within the signal source to a proportional error voltage which actuates the servomechanism. This servomechanism 11 actuated by the error voltage delivers to the load a torque of such direction and magnitude, as to drive the load in a manner that will reduce or null (zero) the error voltage. By itself, the servomechanism is a power amplifier, which increases the small power available from the signal source sufficiently to drive the load and which isolates the load from the signal source. Acting with the signal source, the servomechanism operates as a null-seeking device, which continuously attempts to match a function of the response with a function of the input.

The well-known servomechanism comprises basically a servo control, a servo amplifier, a servo motor and an induction generator. These basic components are connected in a double loop circuit, which includes the input circuits of the adding network. The servo control combines the error voltage from the signal source with a damping voltage derived from the output of the induction generator, which is driven by the servo motor. The combined error and damping voltages form a 60 cycle control voltage, which is amplified by the 60 cycle servo amplifier and supplied to the control winding of the servo motor, the other (main) winding being energized by a 60 cycle power supply. Variation of the control voltage so regulates the servo motor, that it drives at the speed and in the direction to minimize the error voltage.

Since the output of the servo mechanism (control motor) is mechanical, this output must be converted into an equivalent electrical value for operation of the electrical summing network. The potentiometer 12 acts as a mechanical-electrical converter. Its shaft is positioned by the mechanical output, its end terminals are connected to a constant voltage source 13 and its slide contact supplies a voltage of the right phase and frequency with respect to the signal voltage and proportional to the mechanical output. This proportional voltage is fed back through resistor $R(a+b)$, in the same manner as in the case of the network of FIG. 3. The resistors R$a$, R$b$ and $R(A+b)$ in the network of FIG. 4 function exactly the same as they do in the amplifier loop of FIG. 3. Through computations made by this network, the mechanical output is made equivalent to the sum of the input voltage V$a$ and V$b$.

As already indicated, it is desirable to use a feedback resistance $R(a+b+\ldots n)$ of a predetermined value (one megohm in the specific example illustrated). With this value of feedback resistance, the values of input resistances R$a$, R$b$, etc. are calculated in a manner to bring them to the same scale. In doing this, it may be found that one or more of the input resistances must have a value of many megohms. From a practical standpoint, such a high resistance is to be avoided. Besides requiring a large number of resistor units, an input resistance of many megohms creates other problems, which make it undesirable as already indicated. From a practical standpoint, it appears desirable to limit the maximum value of any one resistor in a summing network to 1.3 megohms. If the calculated value of any one of the input resistances R$a$, R$b$, etc. is found to exceed this limit, an equivalent single voltage divider circuit 15 may be used to replace the resistor of excessive calculated value, as shown in FIG. 5. This single voltage divider circuit 15 uses the same input voltage and supplies the same current to the common output connection of the input circuits, as is supplied by the equivalent simple input resistor it replaces, and requires only three resistors of comparatively low value indicated as R1, R2 and R3. In FIG. 5, this single voltage divider 15 is shown as replacing the single calculated input resistor R$a$ of FIG. 3 or 4. These three component resistors R1, R2 and R3 of the single voltage divider 15 are arranged in Y formation (no relation to a 3-phase circuit), with the resistor R1 constituting an input resistor, the resistor R2 being connected to ground or zero potential and the resistor R3 being connected to the common output connection of the input circuits.

It is assumed that R$a$ as calculated above was too large. The voltage applied to the original resistor R$a$ would be V$a$ and the current supplied would be given by the fraction V$a$/R$a$.

In the single voltage divider circuit 15 of FIG. 5, R2 and R3 are effectively in parallel to zero potential, so that the resistance from the junction point 16 to zero potential is $$\frac{R2R3}{R2+R3}$$

and the voltage at point 16 is $$\frac{\dfrac{R2R3}{R2+R3}}{R1+\dfrac{R2R3}{R2+R3}}Va$$

This voltage applied to resistor R3 gives a current to the common connection at the output of the input circuits of $$\frac{\dfrac{R2}{R2+R3}}{R1+\dfrac{R2R2}{R2+R3}}Va$$

which must be equal to V$a$/R$a$ or $$Ra=R1+R3+\frac{R1R3}{R2}$$

R1 and R3 can be chosen less than 1.3 megohms and by making R2 small enough, any large value of R$a$ can be simulated. R1 may be chosen, so that it is not smaller than 0.5 megohm.

Figure 7:
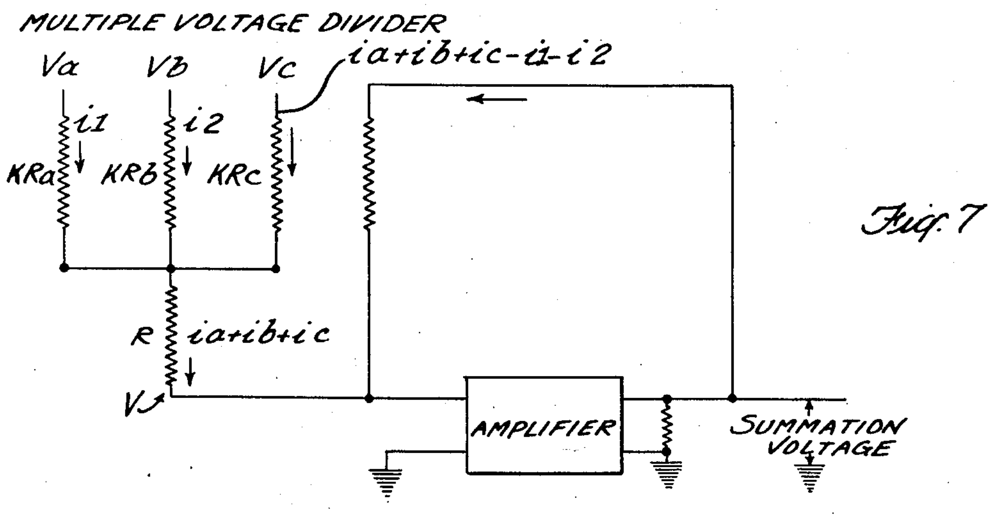
FIG. 7 shows a form of adding network embodying the present invention, this network having a multiple voltage divider replacing the three original or calculated input resistors of FIG. 6.

As a feature of the present invention, where an adding network requires the use of several voltage dividers to obtain proper size resistances, these voltage dividers are combined into a multiple voltages divider. This multiple voltage divider shown in FIG. 7 is designed to replace an originally calculated network indicated in FIG. 6. The requirements for this multiple voltage divider are that it should receive the same applied voltages as would have been applied to the input resistors of the original network of FIG. 6 it replaces, and should deliver the same current to the common output connection of its input circuits as would have been supplied to the common output connection of said original network.

The original calculated network is shown in FIG. 6 for the purpose of illustration with three input resistors R$a$, R$b$ and R$c$ of excessive resistance values to which are applied the input voltages V$a$, V$b$ and V$c$ respectively and which supply currents $ia$, $ib$ and $ic$ respectively to the common output connection. To this common output connection is applied a voltage V and a resultant current $ia+ib+ic$. The resistors R$a$, R$b$ and R$c$ of the original network are reduced by the multiple voltage divider of FIG. 7 to the desired value by an appropriate factor K, and a resistor designated as having the resistance R is added between the common output connection of the resistors KR*a*, KR*b* and KR*c* and the input of the amplifying means.

The diagrams of FIGS. 6 and 7 indicate that the multiple voltage divider of FIG. 7 has the same input voltage as the original circuit (FIG. 6) it replaces. Although the currents drawn from the original voltage sources are different, this fact does not affect the overall operation of the network, since the network does not respond differently to these different currents, as long as the resultant current supplied to the common output connection of the input circuits is the same and at the same voltage V.

From the original circuit of FIG. 6, the following relations are obtained:

$$ia=\frac{Va-V}{Ra};\qquad ib=\frac{Vb-V}{Rb};\qquad ic=\frac{Vc-V}{Rc}$$

From the voltage divider circuit of FIG. 7

$$V+R(ia+ib+ic)+KRai1=Va$$
$$V+R(ia+ib+ic)+KRbi2=Vb$$
$$V+R(ia+ib+ic)+KRc(ia+ib+ic=i1-i2)=Vc$$

Rearranging these as simultaneous equations in *i*1, *i*2 and R, gives $$(KRa)i1+(ia+ib+ic)R=Va-V$$
$$(KRb)i2+(ia+ib+ic)R=Vb-V$$
$$-(KRc)i1-(KRc)i2+(ia+ib+ic)R=Vc-V-KRc(ia+ib+ic)$$

Solving for R by the determinant method, results in $$R=\frac{KRa[KRb(Vc-V)-K^2RbRc(ia+ib+ic)+KRc(Vb-V)]+K^2RbRc(Va-V)}{(ia+ib+ic)[KRa(KRb+KRc)+K^2RbRc]}$$

$$=\frac{K^2RaRb(Vc-V)-K^3RaRbRc(ia+ib+ic)+K^2RaRc(Vb-V)+K^2RbRc(V_a-V)}{(ia+ib+ic)K^2(RaRb+RaRc+RbRc)}$$

Substituting the values of $(Va-V)$, $(Vb-V)$ and $(Vc-V)$ as obtained from the original circuit of FIG. 6, gives $$R=\frac{(1-K)RaRbRc}{RaRb+RaRc+RbRc}=\frac{1-K}{\frac{1}{Rc}+\frac{1}{Rb}+\frac{1}{Ra}}$$

As shown in FIG. 7, the circuit with only four resistors, accomplishes a scale change in three input voltages. The use of separate individual voltage dividers shown in FIG. 5 would have required the use of nine resistors to accomplish this scale change.

The last equation, although specific to a circuit designed to handle three input quantities, can be generalized by extending the denominator to the $1/Rn$ term, as follows:

$$R=\frac{1-K}{\frac{1}{Ra}+\frac{1}{Rb}+\frac{1}{Rc}+\cdots\frac{1}{Rn}}$$

Also, the multiple voltage divider may be provided for only some of the input circuits, while the others, if not exceeding the prescribed resistance limit, may remain as single resistors respectively, according to their original calculated form, as shown in FIG. 8. For example, in the circuit of FIG. 8, two of the original input resistors R*a* and R*b* have been scaled down to the proper limit by multiplying the resistance values of these resistors by the selected reducing factor K and by adding a third resistor R to the common connection of these reduced resistors, according to the relationship $$R=\frac{1-K}{\frac{1}{Ra}+\frac{1}{Rb}}$$

In some cases, it may be found, that by applying the procedure illustrated in FIGS. 6–8, the value of R obtained for the multiple voltage divider is excessive. This can be corrected by adding a resistor from ground to the common output connection of the input resistors in the original calculated circuit, and by assigning to this added resistor the resistance value of unity, as illustrated in FIG. 9. This results in a $1/R$ term equal to unity in the denominator of the value of R, which reduces that value to the required range. FIG. 10 shows the circuit after scaling by the method described. In this circuit, a resistor having the value K is added from ground to the common output connection of the scaled input resistors KR*a* and KR*b*, so that the resistor R will have the resistance value $$\frac{1-K}{\frac{1}{Ra}+\frac{1}{Rb}+1}$$

The equation for both the form of network shown in FIG. 7 and that shown in FIG. 10 may be generalized as follows:

$$R=\frac{1-K}{\frac{1}{Ra}+\cdots\frac{1}{Rn}+x}$$

wherein *x* is zero in the absence of an additional resistor from a point of zero potential to the common output connection of the voltage divider input resistors, as shown in FIG. 7, and is unity in the presence of an additional resistor having a resistance value K from a point of zero potential to the common output connection of said voltage divider input resistors, as shown in FIG. 10.

In both the form shown in FIG. 7 and that shown in FIG. 10, the amplifier may be a computing amplifier or a servomechanism as described in connection with FIGS. 3 and 4.

While the invention has been described with particular reference to specific embodiments, it is to be understood that it is not to be limited thereto but is to be construed broadly and restricted solely by the scope of the appended claims.

What is claimed is:

1. An input network adapted to be associated with an output circuit functioning therewith as a computing network for adding algebraic input voltages applied to said input network, said input network comprising a plurality of input circuits in parallel having a common output connection and being equivalent to a corresponding plurality of input resistors joined at a common output junction, said input circuits being adapted to have applied thereto said voltages respectively, *n* number of said input circuits greater than one consisting of a voltage divider replacing a corresponding *n* number of equivalent input resistors having resistance values R*a* . . . R*n* respectively, and connected to a common output junction, said voltage divider comprising *n* number of input resistors connected to a common output connection and having resistance values KR*a*, . . . KR*n* respectively in which K represents a reducing factor, said voltage divider also comprising a resistor connection between the common output connection of the resistors KR*a*, . . . KR*n* and the common output connection of said input circuits and having the resistance value R, the relationship between said resistance values being represented by the equation $$R=\frac{1-K}{\frac{1}{Ra}+\cdots\frac{1}{Rn}}$$

2. An input network adapted to be associated with an output circuit functioning therewith as a computing network for adding algebraic input voltages applied to said input network, said input network comprising a plurality of input circuits in parallel having a common output connection and being equivalent to a corresponding plurality of input resistors joined at a common output junction, said input circuits being adapted to have applied thereto said voltage respectively, *n* number of said input circuits greater than one consisting of a voltage divider replacing a corresponding *n* number of equivalent input resistors having resistance values R*a*, . . . R*n* respectively, and connected to a common output junction, said voltage divider comprising *n* number of input resistors connected to a common output connection and having resistance values KR*a*, . . . KR*n* respectively in which K represents a reducing factor, said voltage divider also comprising a resistor connection between the common output connection of the resistors KR*a*, . . . KR*n* and the common output connection of said input circuits and having the resistance value R, the relationship between said resistance values being represented by the equation $$R=\frac{1-K}{\frac{1}{Ra}+\cdots\frac{1}{Rn}}+1$$

said network including an additional resistance having a resistance value K from a point of zero potential to the common output connection of said voltage divider input resistors.

References Cited in the file of this patent

UNITED STATES PATENTS

| | | |
|---|---|---|
| 1,912,719 | Nicolas | June 6, 1933 |
| 2,595,185 | Zauderer | Apr. 29, 1952 |
| 2,831,107 | Raymond et al. | Apr. 15, 1958 |

UNITED STATES PATENT OFFICE

CERTIFICATE OF CORRECTION

Patent No. 3,125,677 March 17, 1964

William H. Newell

It is hereby certified that error appears in the above numbered patent requiring correction and that the said Letters Patent should read as corrected below.

In the grant, lines 1 to 3, for "William H. Newell, of Mount Vernon, New York," read -- William H. Newell, of Mount Vernon, New York, assignor to The Sperry Corporation, Ford Instrument Company Division, of Long Island City, New York, a corporation of Delaware, --; line 12, for "William H. Newell, his heirs" read -- The Sperry Corporation, Ford Instrument Company Division, it successors --; in the heading to the printed specification, lines 3 to 5, for "William H. Newell, Mount Vernon, N. Y. (% Ford Instrument Co., 31-10 Thomson Ave., Long Island City 1, N. Y.)" read -- William H. Newell, Mount Vernon, N. Y., assignor to The Sperry Corporation, Ford Instrument Company Division, Long Island City, N. Y., a corporation of Delaware --; column 8, lines 20 to 25, the formula should appear as shown below instead of as in the patent:

$$R=\frac{1-K}{\frac{1}{Ra}+\ldots\frac{1}{Rn}+x}$$

column 10, lines 3 to 5, the formula should appear as shown below instead of as in the patent:

$$R=\frac{1-K}{\frac{1}{Ra}+\ldots\frac{1}{Rn}+x}$$

Signed and sealed this 11th day of August 1964.

(SEAL)
Attest:

ERNEST W. SWIDER
Attesting Officer

EDWARD J. BRENNER
Commissioner of Patents